United States Patent [19]

Nakatani et al.

[11] Patent Number: 4,916,019

[45] Date of Patent: Apr. 10, 1990

[54] CATIONIC ELECTRODEPOSITION COATING COMPOSITION FOR MULTILAYER FILM FORMATION

[75] Inventors: Eisaku Nakatani; Akira Tominaga; Haruo Nagaoka; Yoichi Masubuchi; Masafumi Kume; Tadayoshi Hiraki, all of Hiratsuka, Japan

[73] Assignee: Kansai Paint Co., Ltd., Hyogo, Japan

[21] Appl. No.: 225,292

[22] Filed: Jul. 27, 1988

Related U.S. Application Data

[63] Continuation-in-part of Ser. No. 7,898, Jan. 28, 1987, abandoned.

[30] Foreign Application Priority Data

Jan. 28, 1986 [JP] Japan .................................. 61-14730

[51] Int. Cl.$^4$ ...................... C25D 13/06; B32B 15/08; B32B 24/38; C08L 63/02
[52] U.S. Cl. .................... 428/418; 204/181.7; 523/404; 523/415; 523/417; 525/107; 525/124; 428/416; 524/901
[58] Field of Search .......................... 204/181.1, 181.7; 523/417, 404, 415, 425, 412, 413, 406, 408, 403; 524/901; 525/107, 124; 428/416, 418

[56] References Cited

U.S. PATENT DOCUMENTS

| | | | |
|---|---|---|---|
| 4,017,438 | 4/1977 | Jerabek et al. | 260/29.2 EP |
| 4,174,332 | 11/1979 | Honig et al. | 260/29.2 TN |
| 4,278,580 | 7/1981 | Schmolzer | 523/415 |
| 4,338,235 | 7/1982 | Hazan | 524/504 |
| 4,352,842 | 10/1982 | Kooymans et al. | 427/385.5 |
| 4,430,462 | 2/1984 | Jaeger et al. | 523/402 |
| 4,554,212 | 11/1985 | Diefenbach | 204/181.7 |
| 4,557,976 | 12/1985 | Geist et al. | 428/413 |
| 4,755,418 | 7/1988 | DelRoy | 204/181.7 |

*Primary Examiner*—John F. Niebling
*Assistant Examiner*—Ben C. Hsing
*Attorney, Agent, or Firm*—Wenderoth, Lind & Ponack

[57] ABSTRACT

A cationic electrodeposition coating composition for forming a multilayer film, said composition comprising (A) an epoxy-type cationic electrodepositable resin which is an addition-reaction product formed between an epoxy resin and a basic amino compound, having a surface tension of 40 to 60 dynes/cm and being capable of forming a cathodically depositable aqueous bath by neutralization with an acid, (B) a non-ionic, non-selfcurable, film-forming resin having a surface tension of 25 to 45 dynes/cm, and (C) a blocked polyisocyanate compound as a curing agent, the weight ratio of resin (A) to resin (B) being from 60:40 to 98:2, and the surface tension of resin (A) being at least 5 dynes/cm higher than that of resin (B), and resin (A), resin (B) and the polyisocyanate compound (C) having substantially no ethylenically double bond.

15 Claims, No Drawings

CATIONIC ELECTRODEPOSITION COATING COMPOSITION FOR MULTILAYER FILM FORMATION

This application is a continuation-in-part application of Ser. No. 7,898 filed Jan. 28, 1987 now abandoned.

BRIEF DESCRIPTION OF INVENTION

This invention relates to a cationic electrodeposition coating composition for forming a multilayer film. More specifically, it relates to a cationic electrodeposition coating composition which by one electrodeposition coating, can form a multilayer film having such a concentration gradient that an anticorrosive resin is mainly distributed in lower layer (in contact with the surface of a metallic substrate) and a weather-resistant resin is mainly distributed in an upper layer (a layer located farther from the surface of the metallic substrate), and which is particularly suited as a primer coating for two-coat finishing.

BACKGROUND OF THE INVENTION

In recent years, cationic electrodeposition paints which are based on epoxy resins and are curable with blocked isocyanates were developed as primers for automotive bodies, etc. Because of their excellent corrosion resistance, they have superseded conventional cationic electrodeposition paints and have been widely used.

Previously, in the coating of an automotive body or the like using such a cationic electrodeposition paint, the three-coat finishing involving cationic electrodeposition primer coating→intermediate coating→top coating has been generally practiced. In recent years, to reduce the coating cost, the decreasing of the number of coating steps has been extensively studied, and it has been strongly desired to develop a coating system by which only a two-coat finishing involving cationic electrodeposition primer coating and top coating can give film properties equivalent to those obtained by the conventional 3-coat finishing. In the two-coat finishing, the corrosion resistance of the coated film can be fully obtained by the electrodeposited coated film. But the weatherability of the coated film is not satisfactory as a result of omitting the intermediate coating. Accordingly, in fields where highly weather-resistant finishes are required as in automobiles, the two-coat finishing cannot be employed.

The present inventors have extensively worked in order to solve the above problem of the two-coat finish by imparting both corrosion resistance and weatherability to the cationic electrodeposition paint used for primer coating. This work has led to the discovery that a cationic electrodeposition bath containing as a binder component a dispersion of a nonionic film-forming resin having excellent weatherability such as an acrylic resin or a polyester resin in an epoxy resin-type cationic electrodepositable resin has excellent storage stability because particles of the nonionic film-forming resin are dispersed very stably by the epoxy-type cationic electrodepositable resin and that by mixing the epoxy-type cationic electrodepositable resin and the nonionic film-forming resin in specific proportions, limiting the surface tensions of these resin components within specific ranges and making the surface tension of the former higher than that of the latter, a cationic electrodeposition bath formed by using the resulting mixture as a binder component gives an electrodeposited film in which upon baking, the nonionic filmforming resin rises to an upper layer portion and the epoxy resin moves toward the surface of the metallic substrate, namely to a lower layer owing to the difference in surface tension; and therefore, as a result, it forms a multilayer film having such a concentration gradient that the upper layer portion is occupied mainly by the nonionic film-forming resin and the lower layer portion, mainly by the epoxy resin. This discovery has led to the present invention.

DETAILED DESCRIPTION OF THE INVENTION

According to this invention, there is provided a cationic electrodeposition coating composition for forming a multilayer film, said composition comprising (A) an epoxy-type cationic electrodepositable resin [to be sometimes referred to as "resin (A)"] having a surface tension of 40 to 60 dynes/cm and being capable of forming a cathodically depositable aqueous bath by neutralization with an acid, and (B) a non-ionic non-selfcurable, film-forming resin [to be sometimes referred to as "resin (B)"] the weight ratio of resin (A) to resin (B) being from 60:40 to 98:2, and the surface tension of resin (A) being higher than that of resin (B) and resin (A), resin (B) and the polyisocyanate compound (C) having substantially no ethylenically double bond.

The great characteristic feature of the cationic electrodepositing coating composition of this invention is that by skillfully applying the thermodynamic interactions between the nonionic film-forming resin and the epoxy-type cationic electrodepositable resin and between these resins and the surface of a substrate to be coated, a multilayer primer coat having a concentration gradient in both resins can be formed by one electrodeposition coating and baking operation, and that the composition of the invention can be used in cationic electrodeposition in the form of an aqueous composition which has never been thought of heretofore.

The present invention will be described in more detail below.

Epoxy-Type Cationically Electrodepositable Resin (A)

Typically, the epoxy-type cationic electrodepositable resin (A) include epoxy-type polyamine resins, for example, addition reaction products formed between epoxy resins and basic amino compounds, such as adducts between polyepoxides and primary mono- and polyamines, secondary polyamines or primary-secondary mixed polyamines, adducts between modified products obtained by reacting polyepoxides with modifiers such as aliphatic diols and the above basic amino compounds, and products obtained by modifying the above adducts with plastic modifiers (see, for example, U.S. Pat. Nos. 3,984,299 and 4,104,178); adducts formed between polyepoxides and secondary mono- and polyamines having a ketiminized primary amino group (see, for example, U.S. Pat. No. 4,017,438); and products obtained by the etherification reaction of polyepoxides and hydroxy compounds having a ketiminized primary amino group (see, for example, Japanese Laid-Open Patent Publication No. 43013/1984). These resins are cured with an alcohol-blocked isocyanate compound to form an electrocoating film and have been used conventionally in the field of cationic electrodepositing paints.

Amine-added epoxy resins which can be cured without using blocked isocyanate compounds may also be used as the epoxy-type cationic electrodepositing resin (A). Examples include resins obtained by introducing a beta-hydroxyalkylcarbamate group into polyepoxides (see, for example, Japanese Laid-Open Patent Publication No. 155470/1984 corresponding to U.S. Pat. No. 4,528,363); and resins which can be cured by ester-interchange reaction (see, for example, Japanese Laid-Open Patent Publication No. 80436/1980).

The polyepoxides used for producing the resin (A) include, for example, polyglycidyl ethers of polyphenols which can be produced by reacting the polyphenols with epichlorohydrin in the presence of alkalies. Typical examples of the polyepoxides are bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenylsulfone, phenol novolak, cresol novolak, and mixtures of these.

Preferred polyepoxides from the viewpoint of cost or corrosion resistance are polyglycidyl ethers of polyphenols having a number average molecular weight of at least 380, preferably about 800 to about 2,000, more preferably 1,000 to 6,500, and an epoxy equivalent of generally 190 to 2,000, preferably 400 to 1,000, more preferably 500 to 750. A polyepoxide of the following general formula

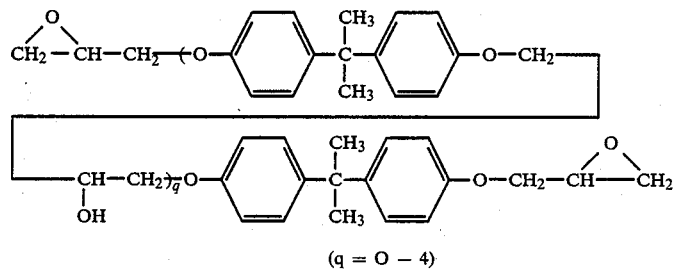

(q = 0 − 4)

is especially preferred.

The amines which can be reacted with the polyepoxides to provide the epoxy-type polyamine resins in accordance with this invention are amino compounds having a primary or a secondary amino group. Specific examples include aliphatic primary amines such as monomethylamine, monoethylamine, monopropylamine, monobutylamne and monohexylamine; aromatic primary amines such as benzylamine; primary alkanolamines such as monoethanolamine and monopropanolamine, and ketiminization products thereof; aliphatic secondary amines such as dimethylamine, diethylamine, dibutylamine and dioctylamine; secondary alkanolamines such as diethanolamine and dipropanolamine; and polyamines such as ethylenediamine, hexamethylenediamine, diethylenetriamine, triethylenetetramine, propylenediamine and N-aminoethanolamine, ketiminization products thereof, diethylaminopropylamine, piperazine, N-methylpiperazine and hydroxyethylaminoethylamine. Water-soluble aliphatic amino compounds are preferred among the above amines. Above all, diethylamine, diethanolamine, monoethanolamine, ketiminized monoethanolamine, diethylenetriamine, ketiminized diethylenetriamine, and hydroxyethylaminoethylamine are preferred.

It is critical to select from the aforesaid epoxy-type cationic electrodepositable resins (A) those which have a surface tension of 40 to 60 dynes/cm, preferably 45 to 55 dynes/cm. If the resin (A) has a surface tension lower than 40 dynes/cm, its compatibility with the nonionic film-forming resin (B) becomes too good and it is difficult to form a multilayer film having the desired concentration gradient. In addition, the resulting coated film tends to have poor weatherability and corrosion resistance. On the other hand, if its surface tension exceeds 60 dynes/cm, the concentration gradient of the resulting multilayer coated film tends to become extreme, and the resins (A) and (B) completely separate into two layers. Consequently, the interlayer adhesion between the resins (A) and (B) becomes inferior.

In the present specification and the appended claims, the "surface tension" of the resin (A) or (B) is measured by the following method.

The resin (A) or (B) is dissolved in a solvent and coated on a degreased smooth tin plate to a dry thickness of 10 micrometers by a bar coater. The coated film is air-dried at room temperature for 1 day, and further dried at 50° C. and 0.1 atm. for 1 hour. Ten minutes later, deionized water is dropped onto the coated film at room temperature, and the angle ($\theta$) of contact between water droplet and the dried resin film is measured.

The surface tension ($\gamma_S$) of the resin (A) or (B) is calculated from the following empirical formula of Sell and Neumann (see Angewandte Chemie, vol. 78, No. 6, 1966).

$$\cos\theta = \frac{(0.015\,\gamma_S - 2)\sqrt{\gamma_S\gamma_L} + \gamma_L}{\gamma_L(0.015\sqrt{\gamma_S\gamma_L} - 1)}$$

where $\gamma_L$ is the surface tension of water (72.8 dynes/cm), and $\gamma_S$ is the surface tension (dynes/cm) of the resin (A) or (B).

Nonionic Film-Forming Resin (B)

For the purpose of the invention, the nonionic film-forming resin (B) used in this invention is desirably a resin having excellent weatherability. Both thermosetting and thermoplastic resins can be used if they have such a property. Acrylic resins, polyester resins, polyester-modified resins and silicone-modified resins are especially suitable. It is important and essential for the resin (B) to be nonionic or in other words, have no functional group which yields a cationic group by acid neutralization. If the resin (B) is ionic, its surface tension is high. Thus, to obtain a multilayer coated film having an ideal concentration gradient as intended by this invention, the skeletal portion (nonionic portion) of the resin (B) should be designed so as to have a low surface tension and consequently, the formed multilayer coated film tends to have inferior interlayer adhesion and corrosion resistance.

Preferred resins (B) will be specifically described blow.

(i) The nonionic acrylic resins may be those obtained by (co)polymerizing in a customary manner at least one acrylic monomer, for example $C_1$–$C_{12}$ alkyl esters of (meth)acrylic acid such as methyl (meth)acrylate, ethyl (meth)acrylate, butyl (meth)acrylate, propyl (meth)acrylate and 2-ethylhexyl (meth)acrylate, $C_1$–$C_4$ hydroxyalkyl esters of (meth)acrylic acid such as hydroxyethyl (meth)acrylate and hydroxypropyl (meth)acrylate, glycidyl (meth)acrylate, and (meth)acrylic acid, and as required at least one other alpha,beta-ethylenically unsaturated monomer such as styrene, styrene derivatives (e.g., alphamethylstyrene), (meth)acrylonitrile and butadiene.

Suitably, the acrylic resins have a number average molecular weight of about 3,000 to about 100,000, preferably about 4,000 to about 50,000. When the acrylic resins contain a hydroxyl group as a functional group, they can be cured by reaction with polyisocyanate compounds which are curing agents for the resin (A).

(ii) The nonionic polyester resins that can be used as the resin (B) may include those which can be produced by polycondensing in a customary manner aromatic, alicyclic or aliphatic polybasic acid components such as phthalic acid, phthalic anhydride, isophthalic acid, terephthalic acid, trimellitic acid, trimellitic anhydride, pyromellitic acid, pyromellitic anhydride, hexahydrophthalic acid, hexahydrophthalic anhydride, succinic acid, adipic acid, pimelic acid, sebacic acid and brassylic acid and aliphatic or alicyclic polyol components such as ethylene glycol, diethylene glycol, propylene glycol, neopentyl glycol, 1,6-hexanediol, trimethylolpropane, glycerol, pentaerythritol, tricyclodecane dimethanol and polycaprolactone diol; and polyester polyols such as polycaprolactone diol. The molecular weights of these polyester resins may be controlled by using benzoic acid, p-t-butylbenzoic acid, etc. as an end blocking agent.

The polyester resins may generally have a number average molecular weight of about 1,000 to about 50,000, preferably about 2,000 to about 10,000.

(iii) Blends at arbitrary ratios of the acrylic resins and the polyester resins described above may also be used as the resin (B). The acrylic resins having the polyesters grafted thereon, and the polyester resins having the acrylic resins grafted thereon may also be used as the resin (B) (these grafted resins are generically called "polyester-modified resins" in the present specification and the appended claims).

(iv) The nonionic silicone-modified resins used as the resin (B) include resins obtained by modifying base resins such as the aforesaid acrylic resins or polyester resins, or alkyd resins with silicone resins. The amount of the silicone resin used is not more than 50% by weight, preferably 3 to 45% by weight, based on the total weight of the resins. If the content of the silicone resin exceeds 50% by weight, the interlayer adhesion between a coated film formed from the composition of this invention and a top coat is liable to be reduced. Furthermore, the resin (A) and the resin (B) tend to be separated completely into two layers, and the interlayer adhesion between them tends to be poor.

The silicone-resins used to modify the base resins usually include organopolysiloxane resins having a number average molecular weight of about 500 to about 2,000 and containing at least two reactive groups such as hydroxyl and alkoxy groups in the molecule. For example, there may be used Z-6018 (a product of Dow Corning Corporation; molecular weight 1600), Z-6188 (a product of Dow Corning Corporation; molecular weight 650), Sylkyd 50, DC-3037 (a product of Dow Corning Corporation, KR-216, KR-218 and KSP-1 (products of Shinetsu-Silicone Co., Ltd.), TSR-160 and TSR-165 (products of Tokyo Shibaura Electrical Co., Ltd.) and SH5050, SH6018 and SH6188 (products of Toray Silicone Co., Ltd.).

The silicone-modified resins can be produced by methods known per se by co-condensing the silicone resins and base resins having hydroxyl groups and/or carboxyl groups in the proportions indicated above.

Among the above-described nonionic film-forming resins, the nonionic acrylic resins, the nonionic polyester resins and the polyester-modified resins are preferred.

Resins having a surface tension of 25 to 45 dynes/cm, preferably 28 to 40 dyes/cm, are selected from the nonionic film-forming resins described above, and used as the resin (B). If the resin (B) has a surface tension lower than 25 dynes/cm, the interlayer adhesion between the resulting coated film and a top coat is reduced. Furthermore, the resin (A) and the resin (B) tend to be separated completely into two layers and the interlayer adhesion between them also tends to become poor. On the other hand, if the surface tension of the resin (B) exceeds 45 dynes/cm, the compatibility of the resin (B) with the resin (A) becomes too good, and a multilayer film having the desired concentration gradient is difficult to form. Furthermore, the coated film tends to have poor weatherability and corrosion resistance.

Electrodeposition Coating Composition

The composition of this invention comprises the aforesaid resin (A) and resin (B) as essential ingredients. If the resins (A) and (B) have surface tensions within the specified ranges and the surface tension of the resin (A) is higher than that of the resin (B), a multilayer film having a concentration gradient can be formed from an electrodeposition coating composition comprising a combination of these resins. Preferably, such a multilayer film can be easily and rapidly formed on a practical basis by selecting and combining the two resins such that the difference in the surface tensions of the resins (A) and (B) is at least 5 dynes/cm, preferably 10 to 20 dynes/cm.

In order to form a multilayer film more easily, it is desirable to select such a combination of the resin (A) and the resin (B) that the resin (A) and the resin (B) are incompatible, or difficultly compatible, with each other. The term "incompatible" and "difficultly incompatible" have the following meanings The resins (A) and (B) are mixed in equal parts by weight, and the mixture is dissolved in a solvent capable of dissolving both of these resins. The solution is uniformly air-sprayed onto a Teflon (polyetetrafluoroethylene) plate, then baked at a fixed temperature between 160° and 220° C. for a fixed period of time between 15 and 60 minutes, allowed to cool, and then peeled from the Teflon plate. When the light transmittances of the separated film measured with regard to light in the ultraviolet region (wavelength about 300 millimicrons) and the visible region (wavelength about 500 millimicrons) are both 0 to about 70%, it is determined that the resins (A) and (B) are "incompatible" or "difficultly compatible" with each other.

The electrodeposition coating composition of this invention can be prepared by dispersing and/or dissolving the resin (A) and the resin (B) in an aqueous medium by methods known per se, for example (1) by dissolving the resin (A) and the resin (B) in a water-miscible organic solvent, and mixing the solution with water and an acid (a water-soluble organic or inorganic acid such as acetic acid, formic acid, lactic acid, phosphoric acid or sulfuric acid) to neutralize the resins and form an aqueous bath; or (2) by dispersing the resin (A) in an aqueous medium, neutralizing the resin (A) with an acid to form an aqueous bath, and forcibly dispersing a solution of the resin (B) in a water-miscible organic solvent into the aqueous bath with a homogenizer or the like. By any of the methods (1) and (2), the resulting compositions show excellent storage stability over long periods of time because the particles of the resin (B) are dispersed very stably in water by the neutralization product of the resin (A).

In preparing the electrodeposition coating composition of this invention, each of the resins (A) and (B) may, as required, comprise a combination of two or more resins. It is critical that the weight ratio of the resin (A) to the resin (B) should be from 60:40 to 98:2, preferably from 70:30 to 95:5, more preferably from 80:20 to 90:10.

When the ratio of the resins (A) and (B) is outside the above-specified range, it is difficult to obtain a multilayer film having an effective concentration gradient, and the resulting film tends to have poor weatherability and corrosion resistance.

As required, colored pigments, anticorrosive pigments, extender pigments and other additives which are usually employed in the field of paints may be added to the composition of this invention comprising the resins (A) and (B).

When epoxy-type cationic electrodepositable resins curable in the presence of a curing agent is used as the resin (A), a blocked polyisocyanate compound with a blocking agent such as blocked isophorone diisocyanate, blocked 4,4'-diphenylmethane diisocyanate, blocked xylylene diisocyanate, blocked hydrogenated xylylene diisocyanate, blocked hexamethylene diisocyanate, blocked tetramethylene diisocyanate, blocked tetramethylene-xylylene diisocyanate, blocked bis-(isocyanate methyl)-cyclohexanone, blocked hydrogenated diphenylmethane diisocyanate may be added as a curing agent in a predetermined amount to the composition of this invention.

As the blocking agent, phenols such as phenol, m-cresol, xylenol, thiophenol; alcohols such as methanol, ethanol, butanol, 2-ethylhexanol, cyclohexanol, ethyleneglycolmonomethylether; oximes such as acetoxime, metyl ethyl ketoxime, methyl isobutyl ketoxime, cyclohexanoxime; ε-caprolactam, ethyl acetoacetate, diethyl malonate, etc. can be used.

In applying the electrodepositing coating composition, known methods and apparatuses used heretofore in cationic electrodeposition coating may be used. Desirably, a metallic substrate to be coated is used as a cathode, and a stainless steel or carbon plate, as an anode. There is no restriction on the electrodeposition coating conditions. Generally, the electrodeposition is carried out with stirring under the following conditions.
Bath temperature: 20°–30° C.
Voltage: 100–400 V (preferably 200–300 V)
Current density: 0.01–3 A/dm$^2$
Current passing time: 1–5 minutes
Electrode area ratio (A/C): 2/1–½
Interelectrode distance: 10–100 cm
The coated film deposited on the substrate as the cathode may be washed and then baked and cured at about 150° to 230° C. for about 10 to 20 minutes. This curing treatment leads to the formation of a multilayer structure in which the epoxy-type resin (A) is predominantly distributed in the lower layer portion in contact with the substrate and the film-forming resin (B) is predominantly distributed in the upper layer portion. This is presumably because in the heat-molten state, the two resins undergo layer separation by the difference in surface tension.

The fact that the resulting electrodeposited film has a multilayer distributed structure can be determined by dividing the coated film into three layers, the uppermost layer, the interlayer and the lowermost layer, in the direction of the metallic substrate (thickness direction), and measuring the ratio of distribution of the resin (B) (content in weight %) in each of the layers. In the electrodeposited film formed from the composition of this invention, the ratio of distribution of the resin (B) is generally at least 50%, preferably 70 to 95%, in the upper most layer, and not more than 10%, preferably not more than 5%, in the lowermost layer.

Thus, by one coating of the electrodeposition coating composition of this invention, a multilayer film can be formed which has a concentration gradient and is composed of a lower layer having excellent corrosion resistance and an upper layer having excellent weatherability. By applying a top coat to it, a film having the same function as in the case of the conventional three-coat finishing can be formed by two-coat finishing.

The following examples illustrate the present invention more specifically. In these examples, all parts and percentages are by weight.

Preparation of Cationic Epoxy-Type Resin (A-1)

(1) bisphenol-type epoxy resin ("Araldite #6071", a product of Ciba-Geigy) (930 parts)
(2) bisphenol-type epoxy resin ("Araldite GY2600", a product of Ciba-Geigy) (380 parts)
(3) polycaprolactone diol ("Placcel #205", a product of Daicel Chemical Industries) (550 parts)
(4) acetic acid salt of dimethylbenzylamine (2.6 parts)
(5) p-nonylphenol (79 parts)
(6) product obtained by ketiminizing monoethanolamine with methyl isobutyl ketone (71 parts)
(7) diethanolamine (105 parts)
(8) butyl Cellosolve (180 parts)
(9) Cellosolve (525 parts)
Components (1) to (6) were together reacted at 150° C. for 2 hours, and then mixed with components (7) to (9). The mixture was reacted at 80° to 90° C. for 3 hours to obtain a resin solution having a solids content of 75%. The resulting resin had a surface tension of 53 dyes/cm.

Preparation of Cationic Epoxy-Type Resin (A-2)

(1) bisphenol-type epoxy resin (Araldite #6071, a product of Ciba-Geigy) (930 parts)
(2) bisphenol-type epoxy resin ("Araldite GY2600", a product of Ciba-Geigy) (380 parts)
(3) polyoxytetramethylene glycol ("PTMG1000", a product of Sanyo Chemical Co., Ltd.) (1000 parts)
(4) dimethylbenzylamine acetate (2.6 parts)
(5) product obtained by ketiminizing monoethanolamine with methyl isobutyl ketone (135 parts)
(6) diethanolamine (105 parts)
(7) butyl Cellosolve (244 parts)
(8) Cellosolve (480 parts)

Components (1) to (5) were together reacted at 160° C. for 2 hours, and then mixed with components (6) to (8). The mixture was reacted at 160° C. for 2 hours to form a resin solution having a solids content of 75%. This resin had a surface tension of 52 dynes/cm.

Preparation of Nonionic Acrylic Resins (B-1 to B-3)

B-1

(1) butyl Cellosolve (26 parts)
(2) 80% polyester monomer ("FM-3X", a product of Daicel Chemical Industries) (37.5 parts)
(3) styrene (40 parts)
(4) hydroxyethyl methacrylate (25 parts)
(5) n-butyl methacrylate (5 parts)
(6) AIBN (azobisisobutyronitrile) (4 parts)
(7) butyl Cellosolve (5 parts)
(8) azobisdimethylvaleronitrile (0.5 part)
(9) Cellosolve (23 parts)

Component (1) was heated to 130° C., and components (2) to (6) were added dropwise at 130° C. over 5 hours. The mixture was maintained at 130° C. for 2 hours, and components (7) and (8) were added dropwise at 130° C. over 2 hours. The mixture was further maintained at 130° C. for 2 hours, and then component (9) was added. The mixture was cooled to form a resin solution having a solids content of 62%, a resin number average molecular weight of about 5,000 and a resin surface tension of 40 dynes/cm

B-2

(1) butyl Cellosolve (26 parts)
(2) 80% polyester monomer ("FM-3X", a product of Daicel Chemical Industries) (87.5 parts)
(3) styrene (25 parts)
(4) hydroxyethyl acrylate (5 parts)
(5) AIBN (4 parts)
(6) butyl Cellosolve (5 parts)
(7) azobisdimethylvaleronitrile (0.5 part)
(8) Cellosolve (23 parts)

Component (1) was heated to 130° C., and components (2) to (45) were added dropwise at 130° C. over 5 hours. The mixture was maintained at 130° C. for 2 hours, and components (6) and (7) were added dropwise at 130° C. over 2 hours. The mixture was further maintained at 130° C. for 2 hours, and then component (8) was added. The mixture was cooled to form a resin solution having a solids content of 62%, a resin number average molecular weight of about 5,000 and a resin surface tension of 35 dynes/cm.

B-3

(1) butyl Cellosolve (26 parts)
(2) styrene (30 parts)
(3) methyl methacrylate (30 parts)
(4) n-butyl methacrylate (20 parts)
(5) hydroxyethyl acrylate (20 parts)
(6) AIBN (4 parts)
(7) butyl Cellosolve (5 parts)
(8) azobisdimethylvaleronitrile (0.5 part)
(9) Cellosolve (23 parts)

Component (1) was heated to 130° C., and components (2) to (6) were added dropwise at 130° C. over 5 hours. The mixture was maintained at 130° C. for 2 hours, and components (7) and (8) were added dropwise at 130° C. over 2 hours. The mixture was further maintained at 130° C. for 2 hours. Then, component (9) was added, and the mixture was cooled to form a resin solution having a solids content of 62%, a resin number average molecular weight of about 5,000 and a resin surface tension of 38 dynes/cm.

Preparation of Cationic Acrylic Resin (C-1)

(1) butyl Cellosolve (26 parts)
(2) methyl methacrylate (50 parts)
(3) 2-ethylhexyl methacrylate (20 parts)
(4) hydroxyethyl acrylate (20 parts)
(5) dimethylaminoethyl methacrylate (10 parts)
(6) AIBN (4 parts)
(7) butyl Cellosolve (5 parts)
(8) azobisdimethylvaleronitrile (0.5 part)
(9) Cellosolve (23 parts)

Component (1) was heated to 130° C., and components (2) to (6) were added dropwise at 130° C. over 5 hours. The mixture was maintained at 130° C. for 2 hours, and components (7) and (8) were added dropwise at 130° C. over 2 hours. The mixture was further maintained at 130° C. for 2 hours, and then component (9) was added. The mixture was cooled to form a resin solution having a solids content of 62%, a resin number average molecular weight of about 5,000 and a resin surface tension of 50 dynes/cm.

Preparation of Nonionic Acrylic Resin Having Ethylenically Double Bond (C-2)

(1) monoethyleneglycolmonoethyletheracetate (49.5 parts)
(2) acrylic acid (12.8 parts)
(3) ethylacrylate (8.5 parts)
(4) methacrylate (17.8 parts)
(5) n-butylacrylate (17.8 parts)
(6) styrene (17.8 parts)
(7) azobisisobutyronitrile (1.4 parts)
(8) tertiary dodecylmercaptan (1.4 parts)
(9) glycidyl methacrylate (25.3 parts)
(10) hydroquinone (0.014 part)

Component (1) was heated to 120° C., and components (2)–(8) were added dropwise at 120° C. over 5 hours.

The product was cooled to 110° C., and components (9) and (10) were added, and then the mixture was further reacted at 105° to 110° C. to an acid value of below 5 mg KOH/g.

Preparation of Silicone-Modified Resin (B-4)

(1) Epikote #828EL (a product of Yuka-Shell Co., Ltd.) (1425 parts)
(2) benzoic acid (458 parts)
(3) cyclohexanone (209 parts)
(4) silicone resin (SH-6018, a product of Dow Corning Corporation) (1684 parts)
(5) tetraisopropyl titanate (10% toluene solution) (16 parts)
(6) cyclohexanone (856 parts)
(7) toluene (344 parts)

Components (1) to (3) were reacted at 170° C. for 5 hours, cooled to 80° C., and mixed with components (4) to (7). The mixture was refluxed and dehydrated at 150° C. It was reacted for about 5 to 8 hours until the amount of water removed reached 17 parts by weight. As a result, a resin solution containing 46% of the silicone resin, a solids content of 71% and a resin surface tension of 30 dynes/cm was obtained.

Formulations of Electrodepositing Coating Compositions

(1) Preparation of an Emulsion (1) Resin solution mixture (resin mixing ratio shown in Table 1 below) (82.6 parts as solids)

(2) 4,4'-diphenylmethane diisocyanate diblocked with ethylene glycol mono-2-ethylhexyl ether (5.0 parts)

(3) isophorone diisocyanate diblocked with methyl ethyl ketone ketoxime (12.4 parts)

(4) polypropyleneglycol 4000 (0.5 part)

(5) lead acetate (6) 10% acetic acid (9.3 parts)

(7) deionized water (185.75 parts)

Components (1) to (4) were uniformly mixed. Components (5) and (6) were added, and they were further mixed uniformly. Then, component (7) was added and they were mixed uniformly with stirring to form an emulsion having a non-volatile content of 32% 120° C.-1 hour).

(2) Preparation of a Pigment Paste

60% quaternary ammonium epoxy resin (dispersing medium) (5.73 parts)
  tianium white (14.5 parts)
  carbon (0.54 part)
  extender pigment (clay) (7.0 parts)
  lead silicate (2.3 parts)
  dibutyltin oxide (2.0 parts)
  deionized water (27.49 parts)

A pigment paste composed of the above ingredients was prepared. It had a non-volatile content of 50% (120° C.-1 hour).

EXAMPLES 1 TO 6 AND COMPARATIVE EXAMPLES 1 TO 4

317.2 parts of the emulsion, 59.56 parts of the pigment paste and 279.64 parts of deionized water were mixed to obtain 8 cationic electrodeposition coating compositions (solids 20%).

In each run, an iron plate treated with zinc phosphate as an electrically conductive article to be coated was immersed in an electrodeposition bath comprising each of the resulting compositions and having a temperature of 28° C. An electric current was passed across the iron plate and an anode as a counterelectrode for 3 minutes at such a voltage which would provide a film thickness of 20 microns after baking. The properties of the resulting coated film are shown in Table 1 below.

Notes (*1) and (*2) to Table 1 are as follows:

(*1): A crosscut was provided in the coated plate whose coated film had been baked at 170° C. for 20 minutes. The plate was sprayed for 480 hours with salt water (5% aqueous sodium chloride solution), and then the width of a rust which occurred from the crosscut was examined.

(*2): The electrodeposited coated film on the iron plate was baked at 185° C. for 20 minutes, and further an aminoalkyd resin-type paint was coated on it to a thickness of 35 microns and baked at 140° C. for 15 minutes. The coated plate was subjected to a sunshine weatherometer for 20 hours and then immersed in water at 40° C. for 20 hours. A crosscut was provided in the coated plate, and the coated plate was subjected to a peeling test using an adhesive cellophane tape. This test was repeated and the time which elapsed until peeling occurred was examined.

TABLE 1

| | Example (Ex.) or Comparative Example (CEx.) | | | | |
|---|---|---|---|---|---|
| | CEx.1 | Ex. 1 | Ex. 2 | Ex. 3 | CEx. 2 |
| Resin components | A-1/B-1 | A-1/B-1 | A-1/B-1 | A-2/B-1 | A-1/B-1 |
| Resin mixing ratio (A/B) | 50/50 | 80/20 | 90/10 | 90/10 | 99/1 |
| Surface tension (dynes/cm) | | | | | |
| Resin A | 53 | 53 | 53 | 52 | 53 |
| Resin B | 40 | 40 | 40 | 40 | 40 |
| Difference in surface tension (dynes/cm) (Resin A − Resin B) | 13 | 13 | 13 | 12 | 13 |
| Salt spray (rust width, mm) (*1) | 4.5 | 1.5 | 1.0 | 1.1 | 0.7 |
| 2-coat clear system weatherability by the peeling time (homs) (*2) | 180 | 150 | 120 | 130 | 30 |
| Overall evaluation | Good weatherability and poor corrosion resistance | Good weatherability and good corrosion resistance | Good weatherability and good corrosion resistance | Good weatherability and good corrosion resistance | Poor weatherability and good corrosion resistance |

| | Ex. 4 | Ex. 5 | Ex. 6 | CEx. 3 | CEx. 4 |
|---|---|---|---|---|---|
| Resin components | A-1/B-4 | A-1/B-2 | A-1/B-3 | A-1/C-1 | A-1/C-2 |
| Resin mixing ratio (A/B) | 90/10 | 90/10 | 90/10 | 90/10 | 90/10 |
| Surface tension (dynes/cm) | | | | | |
| Resin A | 53 | 53 | 52 | 53 | 53 |
| Resin B | 30 | 35 | 38 | 50 | 45 |
| Difference in surface tension (dynes/cm) (Resin A − Resin B) | 23 | 18 | 15 | 3 | 8 |
| Salt spray (rust width, mm) (*1) | 1.5 | 1.3 | 1.4 | 1.5 | 1.5 |
| 2-coat clear system weatherability by the peeling time (homs) (*2) | 80 | 100 | 100 | 60 | 60 |
| Overall evaluation | Slightly poor weatherability | Good weatherability and | Good weatherability and | Poor weatherability and | Poor weatherability and |

TABLE 1-continued

| Example (Ex.) or Comparative Example (CEx.) | | | | |
| --- | --- | --- | --- | --- |
| and good corrosion resistance | good corrosion resistance | good corrosion resistance | good corrosion resistance | good corrosion resistance |

What is claimed is:

1. A cationic electrodeposition coating composition for forming a multilayer film, said composition comprising
   (A) an epoxy-type cationic electrodepositable resin which is an addition-reaction product formed between an epoxy resin and a basic amino compound, having a surface tension of 40 to 60 dynes/cm and being capable of forming a cathodically depositable aqueous bath by neutralization with an acid,
   (B) a non-ionic, non-selfcurable, film-forming resin having a surface tension of 25 to 45 dynes/cm, and
   (C) a blocked polyisocyanate compound as a curing agent,
the weight ratio of resin (A) to resin (B) being from 60:40 to 98:2, and the surface tension of resin (A) being at least 5 dynes/cm higher than that of resin (B), the resin (A) and the resin (B) being incompatible or difficultly compatible with each other and resin (A), resin (B) and the polyisocyanate compound (C) having substantially no ethylenically double bond.

2. The composition of claim 1 wherein the epoxytype cationic depositable resin (A) is selected from the group consisting of adducts formed between polyepoxides and primary mono- and polyamines, secondary polyamines or primary-secondary mixed polyamines, adducts formed between polyepoxides and secondary mono- and polyamines having a ketiminized primary amino group, and products obtained by etherification reaction between polyepoxides and hydroxy compounds having a ketiminized primary amino group.

3. The composition of claim 2 wherein the polyepoxides are polyglycidyl ethers of polyphenols.

4. The composition of claim 3 wherein the polyglycidyl ethers of polyphenol have a number average molecular weight of at least about 380, preferably about 800 to about 2,000, and an epoxy equivalent of 190 to 2,000, preferably 400 to 1,000.

5. The composition of claim 1 wherein the amino compound is selected from the group consisting of diethylamine, diethanolamine, monoethanolamine, ketiminized monoethanolamine, diethylene triamine, ketiminized diethylenetriamine and hydroxyethylaminoethylamine.

6. The composition of claim 1 wherein the epoxytype cationic electrodepositable resin (A) has a surface tension of 45 to 55 dynes/cm.

7. The composition of claim 1 wherein the nonionic film-forming resin (B) is a member selected from the group consisting of acrylic resins, polyester resins, polyester-modified resins and silicone-modified resins.

8. The composition of claim 1 wherein the nonionic film-forming resin (B) is an acrylic resin.

9. The composition of claim 1 wherein the nonionic film-forming resin (B) has a surface tension of 28 to 40 dynes/cm.

10. The composition of claim 1 wherein the surface tension of the resin (A) is 10 to 20 dynes/cm higher than the surface tension of the resin (B).

11. The composition of claim 1 wherein the weight ratio of the resin (A) to the resin (B) is from 70:30 to 95:5.

12. The composition of claim 1 which is in the form of an aqueous bath.

13. The composition of claim 1 wherein the polyisocyanate compound is blocked isophorone diisocyanate or blocked 4,4'-diphenylmethane diisocyanate.

14. A method of electrodeposition coating which comprises applying a cationic electrodeposition coating composition comprising
   (A) an epoxy-type cationic electrodepositable resin which is an addition-reaction product formed between an epoxy resin and a basic amino compound, having a surface tension of 40 to 60 dynes/cm and being capable of forming a cathodically depositable aqueous bath by neutralization with an acid,
   (B) a non-ionic, non-selfcurable, film-forming resin having a surface tension of 25 to 45 dynes/cm, and
   (C) a blocked polyisocyanate compound as a curing agent,
the weight ratio of resin (A) to resin (B) being from 60:40 to 98:2, and the surface tension of resin (A) being at least 5 dynes/cm higher than that of resin (B), the resin (A) and the resin (B) being incompatible or difficultly compatible with each other and resin (A), resin (B) and the polyisocyanate compound (C) having substantially no ethylenically double bond to an electrically conductive surface from a bath containing said coating composition.

15. An article which is electrodeposition-coated by a composition comprising
   (A) an epoxy-type cationic electrodepositable resin which is an addition-reaction product formed between an epoxy resin and a basic amino compound, having a surface tension of 40 to 60 dynes/cm and being capable of forming a cathodically depositable aqueous bath by neutralization with an acid,
   (B) a non-ionic, non-selfcurable, film-forming resin having a surface tension of 25 to 45 dynes/cm, and
   (C) a blocked polyisocyanate compound as a curing agent,
the weight ratio of resin (A) to resin (B) being from 60:40 to 98:2, and the surface tension of resin (A) being at least 5 dynes/cm higher than that of resin (B), the resin (A) and the resin (B) being incompatible or difficultly compatible with each other and resin (A), resin (B) and the polyisocyanate compound (C) having substantially no ethylenically double bond.

* * * * *